June 20, 1972

D. E. ROBINSON

HEATER CONSTRUCTION

Original Filed Dec. 16, 1965

Re. 27,392

INVENTOR.
Donald E. Robinson
BY
Harness, Dickey & Pierce
ATTORNEYS

United States Patent Office

Re. 27,392
Reissued June 20, 1972

27,392
HEATER CONSTRUCTION

Donald E. Robinson, Northville, Mich., assignor to Mobil Temp, Inc., Dayton, Ohio Original No. 3,353,528, dated Nov. 21, 1967, Ser. No. 514,358, Dec. 16, 1965. Application for reissue Dec. 18, 1970, Ser. No. 99,618
Int. Cl. F24c *3/00*
U.S. Cl. 126—91 A 50 Claims

Matter enclosed in heavy brackets [ ] appears in the original patent but forms no part of this reissue specification; matter printed in italics indicates the additions made by reissue.

ABSTRACT OF THE DISCLOSURE

A heater generally for domestic use and having a vertical vent tube and a horizontally extending heat exchanger tube and a flame tube located generally within the heat exchanger tube.

The present invention relates to heater constructions. The heater of the present invention is constructed of a minimum number of components and is of a minimal size. In addition the construction is such that pressure differential conditions which could cause flame-out are minimized. While the heater of the present invention is not limited in its application, because of its unique construction it is particularly useful in house or travel trailer applications.

It is a general object of the present invention to provide a novel heater construction.

It is another object of the present invention to provide a heater construction requiring a minimal number of parts.

It is another object of the present invention to provide a heater construction in which adverse pressure differential conditions which can cause flame-out are minimized.

It is another object of the present invention to provide a compact heater construction requiring minimum space.

It is another object of the present invention to provide a heater construction which is particularly useful for house or travel trailer applications.

Other objects, features, and advantages of the present invention will become apparent from the subsequent description and the appended claims, taken in conjunction with the accompanying drawings, in which:

Figure 1:
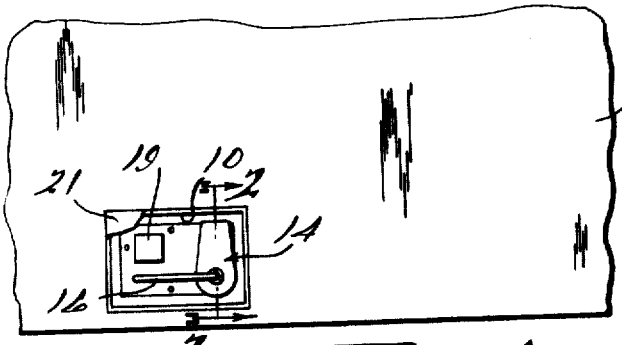
FIGURE 1 is a pictorial representation of the heater of the present invention shown mounted to an outside wall of a house or travel trailer.
Figure 2:
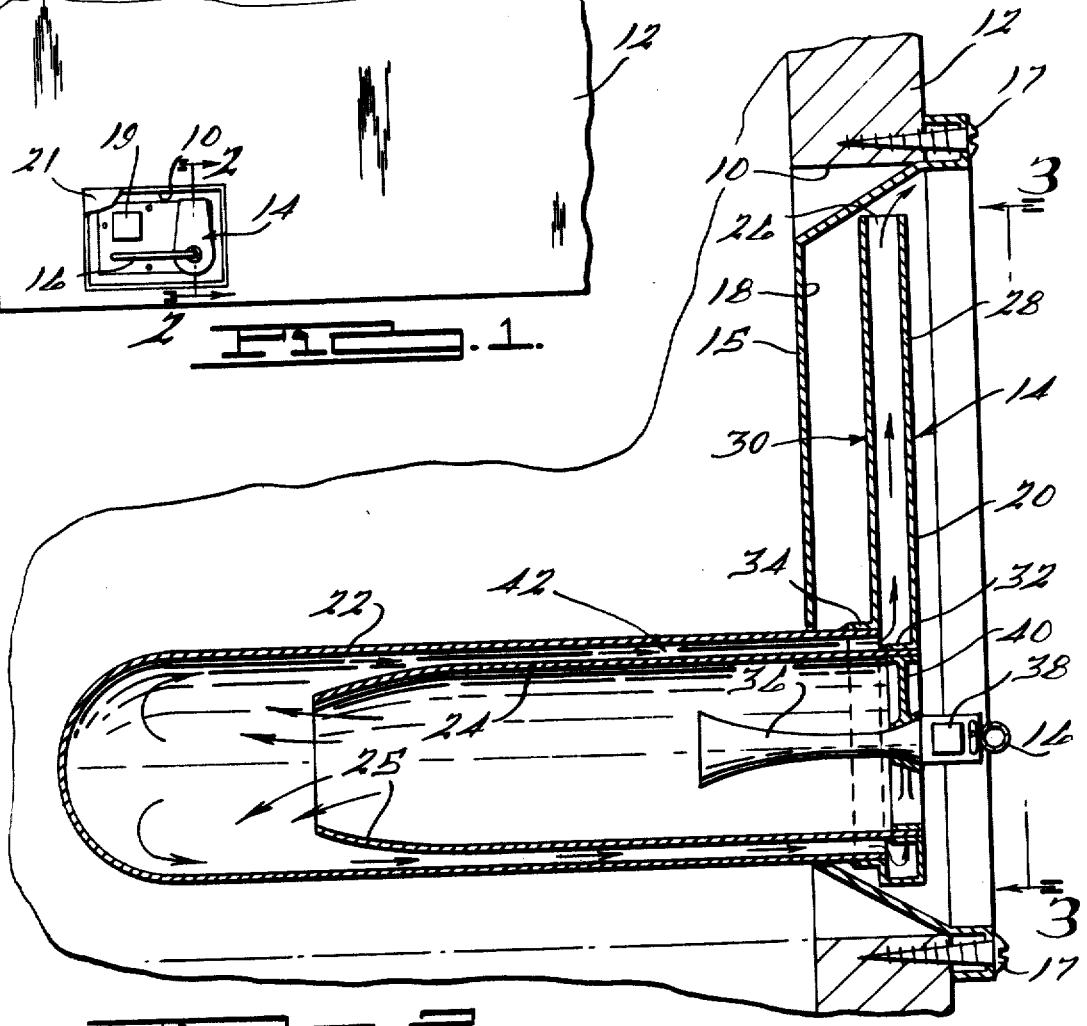
FIGURE 2 is a sectional view of the apparatus of FIGURE 1 taken substantially along the line 2—2.
Figure 3:
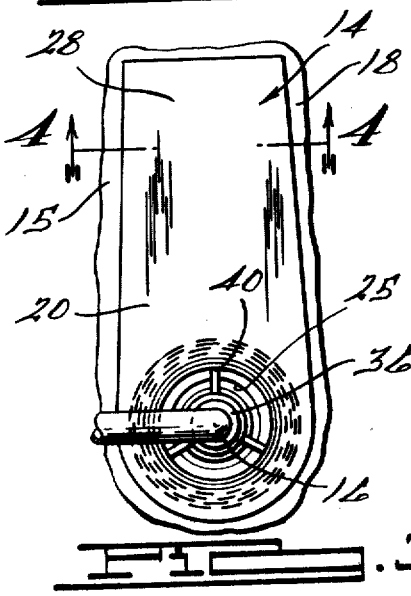
FIGURE 3 is a view to reduced scale of the apparatus of FIGURE 2 taken in the direction of the arrows 3—3.
Figure 4:
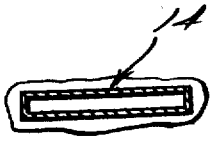
FIGURE 4 is a sectional view taken substantially along the line 4—4 in FIGURE 3.

In FIGURE 1 an opening 10 is shown in the side wall 12 of a trailer, with the opening receiving a heater 14 which receives fuel via a fuel line 16. The heater 14 can be controlled by appropriate control apparatus well known in the art and generally indicated by the numeral 19. Looking now to FIGURES 2–4 a mounting plate 15 is in the opening 10 and is mounted to the side wall 12 by fastener 17. The plate 15 is of a dished construction and defines a recess 18 which extends interiorly from the outer surface of the wall 12 and hence locates a portion of the heater 14 exteriorly of the trailer; the recess 18 can be covered by a cover plate 21 (only partially shown) which is vented to atmosphere.

The heater 14 is of a simple construction including a vent or flue tube 20, a heat exchanger or chamber tube 22 and a flame tube 24. The vent tube 20 is formed of a generally rectangular cross-section (see FIGURE 4), which is decreasing from its lower end to its upper end and which is defined in part at least by outer and inner walls 28 and 30, respectively. The vent tube 20 terminates at its upper end in an opening 26 to permit the escape of products of combustion in a manner to be described. Proximate its lower end, the vent tube 20 in its outer wall 28 has an inwardly extending annular flange 32 and in its inner wall 30 has an inwardly extending flange 34 which is coaxial with and of a larger diameter than the annular flange 32.

The flame tube 24 is a hollow tube open at both ends and has its outer end of a diameter generally equal to the inside diameter of the annular flange 32 and is located therein and secured thereto as by welding, etc. Thus the flame tube 24 secured at its outer end to flange 32 extends inwardly from the vent member 20 through opening 10 and into the confines of the space to be heated. The flame tube 24, while of a generally uniform diameter, is formed to taper radially inwardly at its inner end 25.

The chamber tube 22 is enclosed at its inner end and open at its outer end which is generally of a diameter equal to the inner diameter of the flange 34. Its outer end is located within the flange 34 and is secured thereto by welding or other suitable means. A burner member 36 has its inlet located outwardly from the outer end of the flame tube 24 and extends inwardly into the tube 24 and has its outlet end located within the confines of burner tube 24. The burner 36 can be of a conventional construction and includes an air inlet 38 with fuel being injected via the line 16. The burner 36 is supported within the burner tube 24 by means of a support ring 40 which is generally opened and in turn is supported at the outer end of the flame tube 24. Combustion generally takes place within the flame tube 24 with the chamber tube 22 receiving heat for transfer to an appropriate medium i.e., water and air, etc., via radiation from the flame tube 24 and via the products of combustion. The chamber tube 22 extends substantially beyond the open inner end of the flame tube 24 to define a volume to receive the products of combustion. The flame tube 24 is of a smaller diameter than the chamber tube 22 whereby an annular passageway 42 is defined therebetween. In operation then, fuel injected via the line 16 is burned at the outlet end of the burner 36 within the flame tube 24. The products of combustion generally move in the direction shown by the arrows and hence will move into the space between the end of the flame tube 24 and the chamber tube 22. These products of combustion will then travel through the annular passageway 42, which passageway also extends between annular flanges 32 and 34 and then up through the passageway through the vent tube 28 and out through the opening 26 to the atmosphere. The chamber tube 22 can be utilized to transfer heat either to water or to the adjacent air. The tube 22 can be provided with exterior fins to aid in heat transfer. Note that the chamber tube 22 in separating the flame tube 24 from the medium to be heated provides for a better distribution of heat along its surface than present along the surface of the flame tube 24, i.e., minimizes localized hot spot conditions and at the same time defines a passage for the escape of the combustion products. The flame tube 24 is provided of a diameter only slightly less than the diameter of the chamber tube 22 whereby the passageway 42 is relatively narrow. It is believed that this proximity between tubes 22 and 24 provides for good heat transfer from flame tube 24 to chamber tube 22. Also the narrow passageway 42 provides intimate contact between the heated products of combustion passing therethrough and the walls of the chamber tube 22 whereby good heat transfer results.

In order for complete combustion to $CO_2$ to occur the mixture in the area of combustion must be relatively hot. If this temperature is not high enough incomplete combustion, i.e., to CO, can occur resulting in a loss of efficiency and, of course, in the presence of harmful products i.e., CO. In the present invention the products of combustion in passing through passageway 42 transfer heat to the flame tube 24 whereby the gases within its confines are heated to a temperature at which more complete combustion occurs. Thus the narrow passageway 42 serves several useful heat transfer functions in addition to providing a path for the flow of products of combustion.

In order that the heater 14 work efficiently it is necessary that the products of combustion be discharged and fresh air brought in to insure an adequate supply of oxygen for combustion purposes. By providing the tapered end 25 of flame tube 24 the velocity of the gases emitted from the tube 24 are increased as a result of the nozzle effect caused by the decreasing aperture. It is believed that this increase in velocity enhances the removal of products of combustion and the intake of fresh air. Note also that by virtue of the taper at the end 25 the inlet to passageway 42 is of an enlarged cross-section to aid the flow of the combustion products.

Note that the heater 14 has good flow characteristics and as a result the vent tube 20 can be of a relatively small height. This is an important feature since it permits the location of heater 14 in a small space.

With a heater constructed in accordance with the present invention a compact structure can be obtained; note fo rexample that the vent tube 20 is slightly longer than the flame tube 24 and slightly shorter than the chamber tube 22. Yet this compact design is effective in providing a substantial output; for example a heater having an output of approximately 13,000 B.t.u./hr. could be constructed with a vent tube 28 approximately 14½" in height, a flame tube 24 approximately 13" in length, and a chamber tube 22 approximately 19" in length.

The output of the heater 14 can be controlled or varied for different applications by varying the cross-sectional area of the tubes 22 and 24. Note that with the exit 26 of the flue pipe 20 located within the recess 18 and with the input to the burner tube 24 likewise located within the same recess, drastic differences in air pressure due to erratic air velocities, especially if the heater 14 is located in a vehicle adapted to be moved and while the vehicle is moving, will be substantially eliminated and hence the chances of flame-out will be minimized.

A heater 14 of a simplified construction has been shown; also a heater 14 has been shown in an assembly where differentials in pressure causing flame-out are substantially obviated; also, the heater 14 is readily adaptable for a variety of applications, i.e., hot water, air, etc. In addition, with the heater of the construction as shown and described, a minimum amount of space is required for its installation.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

[1. A heater comprising vent tube means comprising a first tubular body having an outlet for exhausting products of combustion at one end and a passageway connected to an inlet at an opposite end, chamber tube means comprising a second tubular body connected to said first tubular body and having one end open and connected to said inlet and having an opposite end closed, and flame tube means comprising a third tubular body open at both ends and located within and spaced from said second tubular body and connected to said first tubular body with one of said both ends connected to said inlet and with the other of said both ends spaced from said opposite end of said second tubular body, said one of said both ends being in communication with the atmosphere, means for generally blocking said third body from said first body at said one of said both ends, burner means for providing a supply of fuel to be burned in said flame tube means and having an outlet located within said flame tube means and an air inlet located outside of said flame tube means whereby air from the atmosphere is drawn for combustion, and passage means defining a passage for the products of combustion from said flame tube means and between said second and third tubular bodies to said inlet, said passageway, and said outlet, said first tubular body extending generally vertically and with said second and third tubular bodies extending generally horizontally.]

[2. The heater of claim 1 with said third tubular body having a cross-section tapering radially inwardly to a reduced section at said other of said both ends.]

[3. The heater of claim 1 with said passage means including a relatively narrow fluid path between said second and third tubular bodies.]

[4. The heater of claim 2 with said fluid path being of a relatively uniform cross-section and having an enlarged opening between said second and third tubular bodies at said other of said both ends of said third tubular body.]

[5. The heater of claim 1 with said first tubular body having a generally rectangular cross-section and having a first radial flange with said second tubular body having a generally circular cross-section and being connected to said first radial flange.]

[6. The heater of claim 1 with said first tubular body having a generally rectangular cross-section and having a second radial flange with said third tubular body having a generally circular cross-section and being connected to said second radial flange.]

[7. The heater of claim 5 with said first tubular body having a second radial flange with said third tubular body having a generally circular cross-section and being connected to said second radial flange, said first and second flanges being separated to define a portion of said passage means.]

[8. In combination with the heater of claim 1 apparatus adapted for mounting said heater to a vertical wall construction of a trailer having an opening therein said apparatus comprising: a mounting plate having a dished construction defining a cavity extending interiorly from the outside surface of the wall construction, means supporting said heater to said mounting plate with said vent tube means located generally within the confines of said cavity and with said chamber and flame tube means extending interiorly beyond said mounting plate with said inlet and said outlet located substantially within said cavity whereby unbalanced pressure effects on said inlet and outlet are generally obviated.]

9. The heater of claim *13* with said first and second radial flanges being located generally coaxially relative to each other and with said second and third tubular bodies being generally coaxial relative to each other.

[10. The heater of claim 1 with said first tubular body having a height slightly less than the length of said second tubular body and slightly greater than the length of said third tubular body.]

11. The heater of claim 9 with said first tubular body extending generally vertically and having a height slightly less than the length of said second tubular body which extends generally horizontally and slightly greater than the length of said third tubular body which also extends generally horizontally, said passage means including a relatively narrow fluid path between said second and third tubular bodies, said second tubular body having a generally uniform cross section, said third tubular body having a cross section tapering radially inwardly to a reduced section at said other of said both ends.

12. The heater of claim 9 with said first tubular body extending generally vertically and having a height slightly less than the length of said second tubular body which extends generally horizontally and slightly greater than the length of said third tubular body which also extends generally horizontally, said passage means including a relatively narrow fluid path between said second and third tubular bodies, said second tubular body having a generally uniform cross section, apparatus adapted for mounting said heater to a vertical wall construction of a trailer having an opening therein said apparatus comprising: a mounting plate having a dished construction defining a cavity extending interiorly from the outside surface of the wall construction, means supporting said heater to said mounting plate with said vent tube means located generally within the confines of said cavity and with said chamber and flame tube means extending interiorly beyond said mounting plate with said inlet and said outlet located substantially within said cavity whereby unbalanced pressure effects on said inlet and outlet are generally obviated.

*13. A heater comprising vent tube means comprising a first tubular body having an outlet for exhausting products of combustion at one end and a passageway connected to an inlet at an opposite end, chamber tube means comprising a second tubular body connected to said first tubular body and having one end opened and connected to said inlet and having an opposite end closed, and flame tube means comprising a third tubular body open at both ends and located within and spaced from said second tubular body and connected to said first tubular body with one of said both ends connected to said inlet and with the other of said both ends spaced from said opposite end of said second tubular body, said one of said both ends being in communication with the atmosphere, means for generally blocking said third body from said first body at said one of said both ends, burner means for providing a supply of fuel to be burned in said flame tube means and having an outlet located within said flame tube means and an air inlet located outside of said flame tube means whereby air from the atmosphere is drawn for combustion, and passage means defining a passage for the products of combustion from said flame tube means and between said second and third tubular bodies to said inlet, said passageway, and said outlet, said first tubular body extending generally vertically and with said second and third tubular bodies extending generally horizontally, said first tubular body having a generally rectangular cross-section and having a first radial flange with said second tubular body having a generally circular cross-section and being connected to said first radial flange, said first tubular body having a second radial flange with said third tubular body having a generally circular cross-section and being connected to said second radial flange, said first and second flanges being separated to define a portion of said passage means.*

*14. A heater comprising vent tube means comprising a first tubular body having an outlet for exhausting products of combustion at one end and a passageway connected to an inlet at an opposite end, chamber tube means comprising a second tubular body connected to said first tubular body and having one end opened and connected to said inlet and having an opposite end closed, and flame tube means comprising a third tubular body open at both ends and located within and spaced from said second tubular body and connected to said first tubular body with one of said both ends connected to said inlet and with the other of said both ends spaced from said opposite end of said second tubular body, said one of said both ends being in communication with the atmosphere, means for generally blocking said third body from said first body at said one of said both ends, burner means for providing a supply of fuel to be turned in said flame tube means and having an outlet located within said flame tube means and an air inlet located outside of said flame tube means whereby air from the atmosphere is drawn for combustion, and passage means defining a passage for the products of combustion from said flame tube means and between said second and third tubular bodies to said inlet, said passageway, and said outlet, said first tubular body extending generally vertically and with said second and third tubular bodies extending generally horizontally, said first tubular body having a generally rectangular cross-section and having a second radial flange with said third tubular body having a generally circular cross-section and being connected to said second radial flange.*

*15. In combination with a heater comprising vent tube means comprising a first tubular body having an outlet for exhausting products of combustion at one end and a passageway connected to an inlet at an opposite end, chamber tube means comprising a second tubular body connected to said first tubular body and having one end opened and connected to said inlet and having an opposite end closed, and flame tube means comprising a third tubular body open at both ends and located within and spaced from said second tubular body and connected to said first tubular body with one of said both ends connected to said inlet and with the other of said both ends spaced from said opposite end of said second tubular body, said one of said both ends being in communication with the atmosphere, means for generally blocking said third body from said first body at said one of said both ends, burner means for providing a supply of fuel to be burned in said flame tube means and having an outlet located within said flame tube means and an air inlet located outside of said flame tube means whereby air from the atmosphere is drawn for combustion, and passage means defining a passage for the products of combustion from said flame tube means and between said second and third tubular bodies to said inlet, said passageway, and said outlet, said first tubular body extending generally vertically and with said second and third tubular bodies extending generally horizontally: apparatus adapted for mounting said heater to a vertical wall construction of a trailer having an opening therein, said apparatus comprising a mounting plate having a dished construction defining a cavity extending interiorly from the outside surface of the wall construction, means supporting said heater to said mounting plate wtih said vent tube means located generally within the confines of said cavity and with said chamber and flame tube means extending interiorly beyond said mounting plate with said inlet and said outlet located substantially within said cavity whereby unbalanced pressure effects on said inlet and outlet are generally obviated.*

*16. A heater comprising vent tube means comprising a first tubular body having an outlet for exhausting products of combustion at one end and a passageway connected to an inlet at an opposite end, chamber tube means comprising a second tubular body connected to said first tubular body and having one end opened and connected to said inlet and having an opposite end closed, and flame tube means comprising a third tubular body open at both ends and located within and spaced from said second tubular body and connected to said first tubular body with one of said both ends connected to said inlet and with the other of said both ends spaced from said opposite end of said second tubular body, said one of said both ends being in communication with the atmosphere, means for generally blocking said third body from said first body at said one of said both ends, burner means for providing a supply of fuel to be burned in said flame tube means and having an outlet located within said flame tube means and an air inlet located outside of said flame tube means whereby air from the atmosphere is drawn for combustion, and passage means defining a passage for the products of combustion from said flame tube means and between said second and third tubular bodies to said inlet, said passageway, and said outlet, said first tubular body extending generally vertically and with said second and third tubular bodies extending generally horizontally, said first tubular*

*body having a height slightly less than the length of said second tubular body and slightly greater than the length of said third tubular body.*

*17. A substantially flush-mountable heater for a vehicle having at least one outside wall with a generally vertical outside surface and a heater-receiving opening therethrough, said heater comprising: mounting means including plate means, said mounting means being adapted to be secured to said vehicle substantially flush with respect to the outside surface of said wall with said plate means disposed within said heater-receiving opening, said plate means being arranged to be spaced from the plane of said outside surface in the direction of the interior of said vehicle whereby a recess will be defined on the outside side of said plate means between said plate means and said plane; vent tube means comprising means defining a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located in said recess outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally, said second and third tubular bodies being disposed substantially entirely on the inside side of said plate means.*

*18. A substantially flush-mountable heater for a vehicle having at least one outside wall with a generally vertical outside surface and a heater-receiving opening therethrough, said heater comprising: mounting means including flange means and plate means attached thereto, said flange means being adapted to be fastened to said wall about the periphery of said opening and substanitally flush with respect to the outside surface of said wall with said plate means disposed within said opening, said plate means being arranged to be spaced from the plane of said outside surface in the direction of the interior of said vehicle whereby a recess will be defined on the outside side of said plate means between said plate means and said plane; vent tube means comprising means defining a generally vertical first tubular body having an outlet for exhausting products of combustion at the upper end and a passageway connected to an inlet at the lower end, said vent tube means being rectangular in cross-section and disposed in said recess with its larger cross-sectional dimension being generally parallel to said plane; means defining an opening in said plate means; chamber tube means comprising a generally horizontal second tubular body having an open first end and having an opposite closed second end, said second tubular body being disposed on the inside side of said plate means with said first end extending outwardly through said opening in said plate means and being connected to said first tubular body at said inlet; flame tube means comprising a generally horizontal third tubular body open at both ends and connected to said first tubular body, said third tubular body being located within and spaced from said second tubular body with one of said both ends being in communication with the atmosphere in said recess and connected to said first tubular body at said inlet, and the other of said both ends being spaced from said second end of said second tubular body; blocking means for preventing direct fluid communication between said first tubular body and said third tubular body at said one of said both ends thereof; burner means for providing a supply of fuel to be burned in said flame tube means having an outlet located within said flame tube means and an air inlet located in said recess outside of said flame tube means whereby air from the atmosphere is drawn for combustion; and passage means defining a passage for the products of combustion from said flame tube means through the space between said second and third tubular bodies to said inlet, said passageway, and said outlet, said inlet being disposed in horizontal alignment with said open first end of said second tubular body so that said products of combustion will flow horizontally through said space into said vent tube means.*

*19. A heater as claimed in claim 18, further comprising fuel line means disposed for communicating a supply of fuel to said burner means, said fuel line means extending generally horizontally to said burner means, and heater control means disposed in said recess above the level of said fuel line means and to the side of said vent tube means.*

*20. A heater as claimed in claim 19, wherein said vent tube means and chamber tube means are disposed with their center axes offset to one side of the vertical center axis of said plate means, and said heater control means is disposed on the opposite side of said vertical center axis.*

*21. A heater as claimed in claim 20, wherein said heater-receiving opening and said plate means have vertical side edges and horizontal top and bottom edges.*

*22. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body having an outlet for exhausting products of combustion at one end and a passageway connected to an inlet at an opposite end, said vent tube means being disposed wholly within said recess; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being disposed wholly within said recess and being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally.*

*23. A heater as claimed in claim 22, wherein said second and third tubular bodies are disposed for the most part inwardly of said partition means.*

*24. A heater as claimed in claim 22, wherein said one of said both ends of said third tubular body lies generally in a vertical plane.*

*25. A heater as claimed in claim 22, wherein said third tubular body is substantially imperforate throughout its length.*

*26. A heater as claimed in claim 22, wherein said opposite end of said second tubular body tapers radially inwardly to said closed end.*

*27. A heater as claimed in claim 22. wherein said inlet is disposed in horizontal alignment with said open first end of said second tubular body, whereby said products of combustion will flow horizontally through said space into said vent tube means.*

*28. A heater as claimed in claim 22, wherein said partition means is spaced inwardly from the plane of said outside surface a distance approximately equal to the thickness of said outside wall.*

*29. A heater as claimed in claim 22, wherein said air inlet for said burner means is disposed generally in said recess.*

*30. A heater as claimed in claim 22, wherein said space between said second and third tubular bodies is at least in part defined by the upper portions of said second and third tubular bodies respectively.*

*31. A heater as claimed in claim 22, wherein said space between said second and third tubular bodies is at least in part defined by the upper portion of the outer surface of said third tubular body and the upper portion of the inner surface of said second tubular body.*

*32. A heater as claimed in claim 22, wherein said space between said second and third tubular bodies is at least in part annular in cross-section and defined by the outer surface of said third tubular body and the inner surface of said second tubular body.*

*33. A heater as claimed in claim 22, further comprising fuel line means disposed in said recess for communicating a supply of fuel to said burner means, said fuel line means extending generally horizontally to said burner means, and heater control means disposed in said recess above said fuel line means and to the side of said vent tube means.*

*34. A heater as claimed in claim 22, further comprising means defining an upwardly and outwardly extending inclined flow-deflecting surface in said recess adjacent said outlet of said vent tube means.*

*35. A heater as claimed in claim 34, wherein said inclined surface extends substantially the entire width of said recess.*

*36. A heater as claimed in claim 22, wherein said partition means includes a substantially flat and generally vertically disposed plate member.*

*37. A heater as claimed in claim 36, wherein said plate member extends for the full width and full height of said recess, said mounting means further including means defining a top wall, a bottom wall and two side walls to said recess.*

*38. A heater as claimed in claim 37, wherein said recess is substantially the same size and shape in side elevation as said heater-receiving opening.*

*39. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed, said vent tube means and chamber tube means being disposed with their center axes offset to one side of the vertical center axis of said recess; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; passage means defining a passage for the products of combustion from said flame tube means and between said second and third tubular bodies to said inlet, said passageway, and said outlet, said first tubular body extending generally vertically and with said second and third tubular bodies extending generally horizontally; and control means for controlling the fuel supplied to said burner means, said control means being disposed on the side of said vertical center axis opposite said one side.*

*40. A heater as claimed in claim 39, further comprising fuel line means disposed for communicating a supply of fuel to said burner means, said fuel line means extending generally horizontally to said burner means, and heater control means disposed in said recess above the level of said fuel line means and to the side of said vent tube means.*

*41. A heater as claimed in claim 39, wherein said one of said both ends of said third tubular body is disposed within said recess.*

*42. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a generally vertically extending first tubular body having an outlet for exhausting products of combustion at one end and a passageway connected to an inlet at an opposite end, said first tubular body constituting the entire vertically extending flue for said heater and being disposed wholly within said recess; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said second and third tubular bodies extending generally horizontally.*

*43. A heater as claimed in claim 42, wherein said first tubular body has a vertical height less than the horizontal length of said second tubular body.*

*44. A heater as claimed in claim 42, wherein said one of said both ends of said third tubular body is disposed within said recess.*

*45. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally, said passage means including an expansion space for said products of combustion immediately downstream of said flame tube means, said space having a cross-sectional area for flow greater than that of said flame tube means and of the space between said second and third tubular bodies.*

*46. A heater as claimed in claim 45, wherein said one of said both ends of said third tubular body is disposed within said recess.*

*47. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere, said one of said both ends and said outlet lying generally in a common vertical plane disposed within said recess; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally.*

*48. A heater adapted to be mounted in an outside wall having a generally vertical outside surface and a heater-receiving opening therethrough, said heater comprising: mounting means for mounting said heater with respect to said wall, said mouting means including partition means spaced inwardly from the plane of said outside surface and defining a recess between said partition means and said plane; vent tube means comprising a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally, said first tubular body constituting the entire vertically extending flue for said heater and having a vertical height less than the horizontal length of said second tubular body.*

*49. A heater as claimed in claim 48, wherein said one of said both ends of said third tubular body is disposed within said recess.*

*50. A heater as claimed in claim 48, wherein said passage means includes an expansion space for said products of combustion immediately downstream of said flame tube means, said space having a cross-sectional area for flow greater than that of said flame tube means and of the space between said second and third tubular bodies.*

*51. A heater for a vehicle having at least one outside wall with a generally vertical outside surface and a heater receiving opening therethrough, said heater comprising: mounting means including flange means and plate means attached thereto, said flange means being adapted to be fastened to said wall about the periphery of said opening and substantially flush with respect to the outside surface of said wall with said plate means disposed within said opening, said plate means being arranged to be spaced from the plane of said outside surface in the direction of the interior of said vehicle whereby a recess will be defined on the outside side of said plate means between said plate means and said plane; vent tube means comprising means defining a generally vertical first tubular body having an outlet for exhausting products of combustion at the upper end and a passageway connected to an inlet at the lower end, said vent tube means being rectangular in cross-section and disposed in said recess with its larger cross-section dimension being generally parallel to said plane; means defining an opening in said plate means; chamber tube means comprising a generally horizontal second tubular body having an open first end and having an opposite closed second end, said second tubular body being disposed on the inside side of said plate means with said first end extending outwardly through said opening in said plate means and being connected to said first tubular body at said inlet; flame tube means comprising a generally horizontal third tu-*

*bular body at both ends and connected to said first tubular body, said third tubular body being located within and spaced from said second tubular body with one of said both ends being in communication with the atmosphere in said recess and connected to said first tubular body at said inlet, and the other of said both ends being spaced from said second end of said second tubular body; blocking means for preventing direct fluid communication between said first tubular body and said third tubular body at said one of said both ends thereof; burner means for providing a supply of fuel to be burned in said flame tube means having an outlet located within said flame tube means and an air inlet located outside of said flame tube means whereby air from the atmosphere is drawn for combustion; and passage means defining a passage for the products of combustion from said flame tube means through the space between said second and third tubular bodies to said inlet, said passageway, and said outlet.*

*52. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected directly to and supported in part by said first tubular body at said inlet and with the other of said both ends spaced from said opposite end of said second tubular body, said one of said both ends being in communication with the atmosphere; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally.*

*53. A heater as claimed in claim 52, wherein said one of said both ends of said third tubular body is disposed within said recess.*

*54. A heater as claimed in claim 52, wherein said third tubular body is supported solely by said first tubular body.*

*55. A heater adapted to be mounted in an outside wall having a generally vertical outside surface and a heater-receiving opening therethrough, said heater comprising: mounting means for mounting said heater with respect to said wall, said mounting means including partition means spaced inwardly from the plane of said outside surface and defining a recess between said partition means and said plane; vent tube means comprising a first tubular body disposed in said recess having an outlet for exhausting products of combustion at one end and a passageway connected to an inlet at an opposite end; chamber tube means comprising a second tubular body connected to said first tubular body and having one end opened and connected to said inlet and having an opposite end closed; flame tube means comprising a third tubular body open at both ends and located within and spaced from said second tubular body, and connected to said first tubular body with one of said both ends connected to said inlet and with the other of said both ends spaced from said opposite end of said second tubular body, said one of said both ends being in communication with the atmosphere, the inside surface of said third tubular body being smooth and uninterrupted in the longitudinal direction; means for generally blocking said third body from said first body at said one of said both ends; burner means for providing a supply of fuel to be burned in said flame tube means and having an outlet located within said flame tube means and an air inlet located outside of said flame tube means whereby air from the atmosphere is drawn for combustion; and passage means defining a passage for the products of combustion from said flame tube means and between said second and third tubular bodies to said inlet, said passageway, and said outlet, said first tubular body extending generally vertically and with said second and third tubular bodies extending generally horizontally.*

*56. A heater as claimed in claim 55, wherein said one of said both ends of said third tubular body is disposed within said recess.*

*57. A heater as claimed in claim 55, wherein the space between said third tubular body and said second tubular body is substantially smooth and uninterrupted in the longitudinal direction.*

*58. A heater as claimed in claim 55, wherein said passage means includes an expansion space for said products of combustion immediately downstream of said flame tube means, said space having a cross-sectional area for flow greater than that of said flame tube means and of the space between said second and third tubular bodies.*

*59. A heater as claimed in claim 55, wherein said vent tube means and chamber tube means are disposed with their center axes offset to one side of the vertical center axis of said recess, and control means for controlling the fuel supplied to said burner means, said control means being disposed on the opposite side of said vertical center axis.*

References Cited

The following references, cited by the Examiner, are of record in the patented file of this patent or the original patent.

UNITED STATES PATENTS

| | | | |
|---|---|---|---|
| 2,387,883 | 10/1945 | Dake | 122—136 |
| 3,028,843 | 4/1962 | Carlson et al. | 122—149 |
| 2,717,580 | 9/1955 | Maher et al. | 122—136 X |
| 2,887,074 | 5/1959 | Friedberg | 110—8 C |
| 2,917,030 | 12/1959 | Tramontini | 122—149 |
| 2,478,732 | 8/1949 | Wilson et al. | 126—360 |
| 3,174,474 | 3/1965 | Jones et al. | 126—91 |
| 3,266,485 | 8/1966 | Girton | 126—360 |

FOREIGN PATENTS

| | | |
|---|---|---|
| 1,357 | 1915 | Great Britain. |
| 537,657 | 7/1941 | Great Britain. |

CHARLES J. MYHRE, Primary Examiner

UNITED STATES PATENT OFFICE

CERTIFICATE OF CORRECTION

Patent No. Re. 27,392 Dated June 20, 1972

Inventor(s) Donald E. Robinson

It is certified that error appears in the above-identified patent and that said Letters Patent are hereby corrected as shown below:

Column 3, line 33, "fo rexample" should be -- for example --.

Column 5, line 73, "turned" should be -- burned --.

Column 6, line 43, "wtih" should be -- with --.

Column 12, line 6, "mouting" should be -- mounting --.

Column 13, line 1, after "body" insert -- open --.

Signed and sealed this 1st day of May 1973.

(SEAL)
Attest:

EDWARD M.FLETCHER,JR
Attesting Officer

ROBERT GOTTSCHALK
Commissioner of Patents